April 4, 1972    H. R. SMITH, JR    3,654,108
METHOD FOR GLOW CLEANING
Filed Sept. 23, 1969
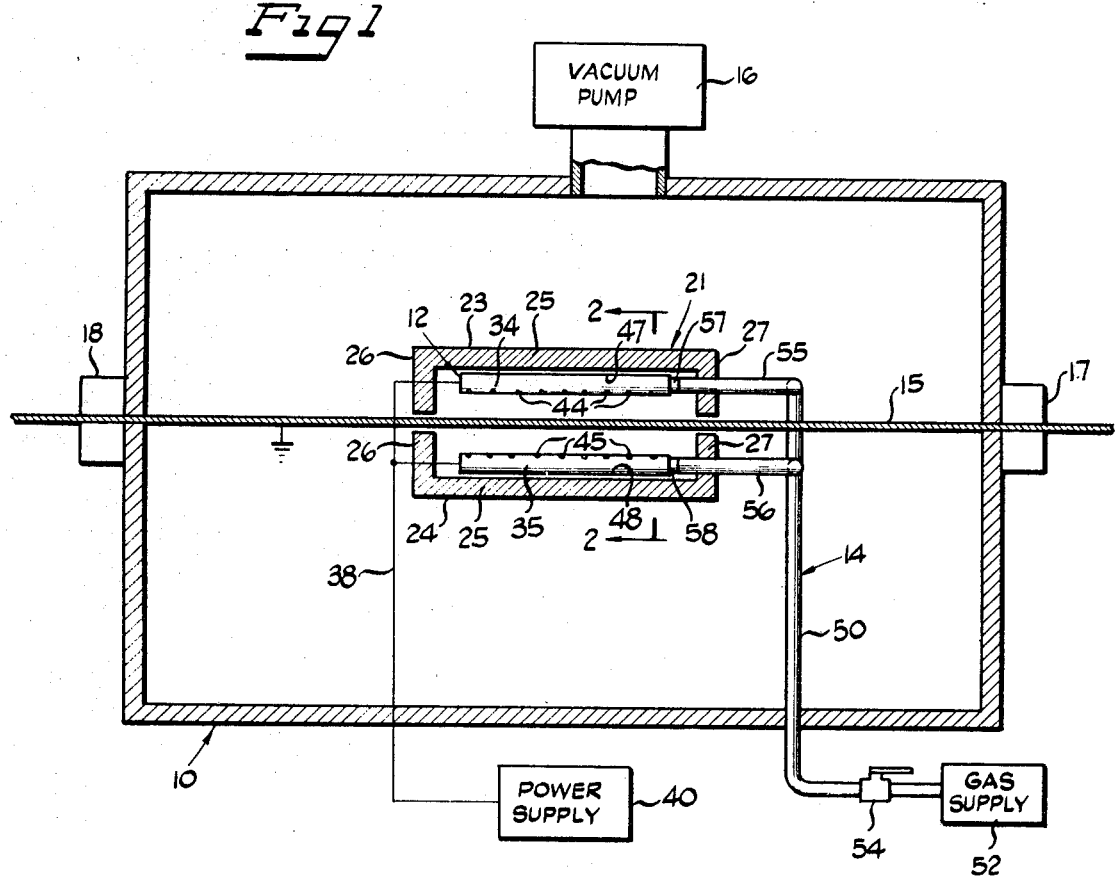
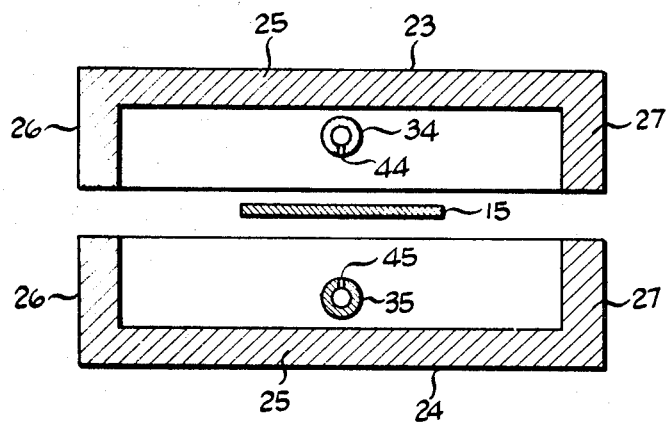
Inventor
HUGH R. SMITH, JR.
By Anderson, Luedeka, Fitch, Even & Tabin
Atty's

United States Patent Office 3,654,108
Patented Apr. 4, 1972

3,654,108
METHOD FOR GLOW CLEANING
Hugh R. Smith, Jr., Piedmont, Calif., assignor to Air Reduction Company, Incorporated, New York, N.Y.
Continuation-in-part of application Ser. No. 484,417, Sept. 1, 1965. This application Sept. 23, 1969, Ser. No. 867,113
Int. Cl. C23g 5/00; B08b 5/00; B01k 1/00
U.S. Cl. 204—164    6 Claims

ABSTRACT OF THE DISCLOSURE

A glow cleaning method for removing contaminants from the surface of a substrate which is to be subsequently coated employs a reactive gas capable of yielding negative ions in the glow discharge which are chemically combinable with the contaminants, and an electric field accelerates these ions toward the surface to be cleaned. The contaminants are dislodged from the surface by physical bombardment and are removed by chemical reaction with the bombarding ions to produce reaction products which do not readily adhere to the substrate surface.

---

The present invention relates generally to the removal of contaminants from the surface of a substrate, and more particularly it relates to an improved method for the vacuum glow-discharge cleaning of the surface of a substrate. The present application is a continuation-in-part of application Ser. No. 484,417, filed Sept. 1, 1965, and now abandoned.

It is well known that the exposure of the surface of an article to air often results in the formation of a contaminant coating on the surface of the article. The contaminant coating is usually in the form of adsorbed or absorbed gases, or in the form of an oxide coating on the surface of the article. Oxide coatings may be visible such as the characteristic greenish coating formed on a copper surface, or may be invisible such as the oxide coating formed on aluminum. The presence of an oxide coating, or the presence of various other contaminants, on a metal or other surface is undesirable in some instances. For example, when it is desired to deposit a thin film of a suitable evaporant on the surface of a substrate by vacuum evaporative techniques, the presence of contaminants on the surface of the substrate may impair the bond formed between the evaporant and the surface of the substrate. As used herein, "contaminant" includes any materials deposited on the surface of a substrate or any gases adsorbed or absorbed in the substrate, which may interfere with the bond formed between the substrate and coating deposited upon the substrate by vacuum evaporative techniques.

Attempts have been made to clean the surfaces of a substrate by various chemical means prior to coating. Such means have generally proven unsatisfactory since a sufficiently high degree of cleaning is often unattainable, and the chemical employed is often harmful to the substrate. Means have also been developed for bombarding the surface of the substrate with chemically inert particles, for example atoms of argon, neon, etc., to dislodge impurities. Bombardment cleaning has generally been unsatisfactory, since the dislodged impurities remain in the system and are often redeposited on the surface of the substrate, and other contaminants present elsewhere in the system are often dislodged by the bombardment and may become deposited on the surface being cleaned.

It is also known to clean the surface of metals, glass and other articles by a method commonly known as glow-discharge cleaning. Glow-discharge cleaning is accomplished by establishing an electrostatic field having a high voltage gradient in the region of the article to be cleaned within a vacuum chamber. A sufficient amount of an inert gas is then bled into the chamber so that the electrostatic field causes ionization of the gas and the establishment of a self-sustaining glow discharge. The gaseous ions are accelerated by the electrostatic field, and are attracted to the surface of the substrate, which they strike at a high velocity, thereby dislodging surface contaminants. Impurities dislodged from the surface of a substrate by glow discharge cleaning also remain in the system and often become redeposited on the surface of the substrate, making this method somewhat inefficient.

Examples of such known cleaning methods are described by L. Holland in his book entitled Vacuum Deposition of Thin Films, Chapman and Hall Ltd., London, England, 1966 (first published in 1956). In particular, Holland discloses on page 75 the use of positive ion bombardment of a glass surface under the attractive forces of a negative surface charge on the glass. For cleaning a metal surface, Holland suggests making the metal surface the cathode electrode and causing the discharge to take place in an inert gas or hydrogen, which produces positive ion bombardment or sputtering of the surface. Holland also proposes the removal of contaminants from glass surfaces (which attain a negative surface charge) by a prolonged and intense glow discharge in the presence of oxygen. That is, Holland states that by employing positive ion bombardment of the surface, contaminants such as hydrocarbons are decomposed, and if oxygen is present in the residual gas, the non-volatile carbon constituent is removed as carbon monoxide.

However, in contradistinction to the aforementioned glow cleaning methods employing positive ion bombardment, the method of the present invention employs negative ion bombardment wherein the negative ions are chemically combinable with the contaminants so that the bombarding negative ions dislodge the contaminants from the surface as well as chemically react to produce reaction products not readily adhering thereto. Thus, rather than using a positive ion bombardment in the presence of a scavenging or oxidizing gas which may chemically react with the contaminants as in the prior proposed methods, the present method produces negative ions having the desired reaction characteristics, generally being reducing agents, and accelerates these negative ions themselves as the bombarding particles, resulting in substantially more effective cleaning than heretofore attained with such prior methods where the charge polarity of the surface to be cleaned would tend to repel the atoms of the scavenger gas. To obtain the acceleration of these negative reactive ions thus generally requires that the surface to be cleaned be relatively positive or, in the case of a metal surface, to be the anode electrode, rather than having the opposite polarities as used with the prior glow cleaning methods. The positive polarity of the surface in the present method also attracts and accelerates bombarding electrons, as well as the negative ions, from the discharge, rather than repelling such electrons as in the prior methods, and this also aids the cleaning process.

Although the acceleration of negative ions for bombarding a surface has heretofore been known for depositing or coating a film of oxide or other material onto a surface or substrate, the method of the present invention involves the recognition that the bombardment of a surface by negative reactive ions may instead be used for removing such materials from a surface. That is, to produce the opposite result of a coating or deposition process, and resulting in a more effective and complete cleaning than that of the aforementioned prior pre-deposition cleaning methods.

Accordingly, it is a principal object of the present invention to provide an improved method for cleaning the surface of a substrate.

It is another object of the present invention to provide an improved method for glow-discharge cleaning the surface of a substrate to obtain a relatively impurity-free surface prior to the application of a coating by vacuum evaporative techniques.

Other objects and advantages of the present invention will become readily apparent from the following detailed description and accompanying drawing, wherein:

FIG. 1 is a schematic elevational view, partly in section, of apparatus operating in accordance with the method of the present invention, and FIG. 2 is an enlarged sectional view taken along line 2—2 of FIG. 1.

A cleaning method, in accordance with the present invention, for removing oxide and gaseous contaminants from the surface of a substrate which may otherwise impair or interfere with the application or deposition of a coating to be subsequently formed thereon, generally comprises the steps of (1) introducing into a vacuum enclosure a reactive gas capable of yielding negative ions which are chemically combinable with at least a portion of the contaminants; (2) generating an electric field in the vacuum enclosure having a potential gradient between the location of the surface to be cleaned and a location spaced away from the surface, which may be the location at which the gas is introduced into the enclosure; (3) polarizing the potential gradient so that the location of the surface is positive relative to the other or spaced location; and (4) providing the magnitude of the potential gradient and the pressure of the reactive gas at values causing ionization of the gas and the forming of the negative ions in a sustained glow-discharge, and causing the acceleration of the negative ions toward the surface to be cleaned with sufficient energy to dislodge the contaminants therefrom and to chemically react with at least a portion of the contaminants to produce reaction products which do not readily adhere to the surface. The substrate to be cleaned may be passed through the path of the negative ions accelerated by the electrostatic field, whereupon the ions strike the moving surface of the substrate causing the contaminants to be removed therefrom both by bombardment of the ions against the substrate and by chemical reaction between the ions and the contaminants. As will be described in greater detail hereinafter, the reactive gas is preferably selected from the group consisting of organic halides and fluorinated hydrocarbons, but other suitable gases may be employed alternatively.

For purposes of description, the method is described hereinafter with respect to an apparatus for practicing the method; however, it is to be understood that the method of the invention may be practiced by other forms of apparatus than that illustrated and described.

Referring now to the drawing, the apparatus shown in FIG. 1 includes a high vacuum enclosure 10, which contains electrodes 12 for establishing a high potential electrostatic field within the enclosure. A gas supplying means 14 is provided for introducing suitable quantities of the reactive gas into the electrostatic field and means (not shown) are provided for passing a substrate 15, which is to be cleaned within the enclosure 10, through the electrostatic field.

The high vacuum enclosure 10 is coupled to a suitable vacuum pump 16 adapted for maintaining the enclosure at a relatively low pressure which is suitable for maintaining glow-discharge operations. The particular pressure selected generally depends on the associated equipment, such as the shape of the electrode, the type of gas introduced, and the characteristics of the power supply. Generally, the pressure is maintained between approximately 5 and 100 millitorrs, although other values of pressure may also be suitable in some instances. A pair of vacuum seal locks 17, 18 are provided for passage of the substrate 15 through the enclosure 10 while precluding the entry of undesired gases and for maintaining the desired vacuum within the enclosure. If it is desired to treat a material having a configuration other than that of an elongated strip of material, the vacuum enclosure 10 may be readily modified for processing such a material. For example, a door may be provided in the enclosure through which various shaped materials may be introduced and removed.

It is advantageous to provide a constraining means or shielding structure 21 for constraining the electrostatic field and reactive gas within a preselected area of the enclosure 10 surrounding the surface of the substrate to be cleaned. Such a provision is desirable in view of the relatively high chemical reactivity of the negative ions which are formed upon ionization of the reactive gas, which ions may chemically react with the walls or other hardware present within the enclosure 10 unless suitable means are provided for constraining the electrostatic field and negative ions to a limited area within the enclosure 10. One form of constraining means 21 for the electrostatic field, as seen in FIG. 1, defines a chamber 22 centrally disposed about an appropriate portion of the substrate 15 within the enclosure 10, so that the electrostatic field and negative ions may be confined to the area defined by chamber 22. The shielding structure may be fabricated of a stable, nonconductive material and comprise a pair of opposed spaced, open-topped rectangular boxes 23 and 24. Each of the boxes 23 and 24 includes a bottom wall 25 having four depending side walls 26, 27, 26' and 27', as shown in FIGS. 1 and 2. The depending walls of each of the boxes 23 and 24 terminate in spaced relationship with respect to each other so as to permit the substrate 15 to pass unobstructedly through the chamber 22, while at the same time substantially constraining the electrostatic field and reactive ions within the chamber 22.

The electrostatic field generating electrodes 12 are disposed within the chamber 22. In the apparatus shown in the drawing, the electrodes 12 include first and second conductive electrode members 34 and 35 disposed within the interior of the chamber 22 on opposite sides of the substrate 15, and function in a manner somewhat analogous to a cathode structure. Preferably, the electrode members 34 and 35 are positioned relatively closely to the bottom wall 25 of the boxes 23 and 24. The electrode members 34 and 35 are coupled through a conductor 38 to a high voltage power supply 40, which maintains the electrode members 34 and 35 at a relatively high negative potential with respect to ground. A suitable operating potential generally may be selected at an appropriate point between about 350 volts and about 5000 volts. The substrate 15 is maintained at ground potential, as shown, and thus functions as an anode in that it is at a relatively high positive potential with respect to the electrode members 34 and 35. Accordingly, a high potential electrostatic field gradient is established between the electrode members 34 and 35 and the surface of the substrate 15. The electrode members 34 and 35 extend longitudinally of the chamber 22 and the substrate 15 as seen in FIG. 1. It is also contemplated that the electrode members may extend transversely of the chamber 22, and this embodiment is desirable when the substrate has a substantial width, in order to establish a uniform electrostatic field over the entire surface of the substrate. It is also contemplated to employ a plurality of electrodes in place of the single electrode shown in the drawing.

The reactive gas is delivered into the electrostatic field which causes ionization of the gas in the glow-discharge and the formation of reactive negative ions. As seen in the drawing, the reactive gas is preferably delivered into the electrostatic field through the electrode members 34 and 35, which are preferably hollow, defining chambers 47 and 48 respectively, and have a plurality of apertures 44 and 45 in the walls thereof facing the substrate 15. The gas supplying means 14 includes a conduit 50 connected to a suitable gas supply 52 through a metering valve 54. The conduit 50 extends into the enclosure 10 and is coupled to one end of each of the hollow electrode members 34 and 35 through manifolds 55, 56 which are insulated from the electrode members 34, 35 by a pair of nonconductive annular spacers 57, 58. The gas is supplied from the gas supply 52 through the conduit 42 and manifolds 55, 56 to the interior of the electrode members 34 and 35 and passes from the chamber 47, 48 into the interior of the chamber 22 through the apertures 44, 45. The gas pressure within the chambers 47, 48 causes the reactive gas to flow out of the apertures 44, 45 toward the substrate 15 and impinge thereon by natural convection. This is advantageous in that it results in confining the negative ions to the chamber 22 and in the region adjacent the surfaces of the substrate 15.

The reactive gas may be any gas which will become ionized in the electrostatic field established within the chamber 22 and which, upon ionization, forms negative ions that are reactive with at least a portion, preferably a major portion, or substantially all of the contaminants present on the surface of the substrate. It is preferable that the negative ions react with the contaminants to form gaseous reaction products which may be removed from the system by the vacuum pump.

The principal contaminant to be removed by chemical reaction with the negative ions is an oxide coating which is typically present on a metal or glass substrate to be subsequently coated. Accordingly, for this purpose the reactive gas is preferably one which will provide ions in the glow-discharge which are both negative and reactive with oxides to form gaseous reaction products. Preferred reactive gases are those which yield negative ions and are reducing agents, such as gaseous organic halides, for example, trichloroethylene ($C_2HCl_3$), HCl, $CH_4$, $C_2H_6$, and various fluorinated hydrocarbons commonly sold under the trade name of Freons. Trichloroethylene has been found to be particularly suitable for removing an oxide coating from the surface of steel. A mixture of gases may be used, and other gases may be included, if desired. Such other gases may, for example, be reducing agents, such as hydrogen, but not yielding negative ions. However, whatever the particular gas mixture used, in accordance with the present invention, the gas mixture includes one or more reducing gases that do yield negative ions which are then accelerated toward and bombard the surface to be cleaned.

In operation, a suitable voltage is applied to the electrode members 34 and 35, for example, a negative potential of about 1500 volts with respect to ground. When the substrate 15 is fabricated of a conductive substance, such as a metal, the substrate is grounded thereby establishing an electrostatic field between the electrode members 34 and 35 and the surfaces of the substrate 15. In those instances where the substrate 15 being cleaned is a non-conductor, such as glass, the initiation of the negative potential at the electrode members 34, 35 causes the build-up of a positive static charge on the opposite surfaces of the material 15 so that a high potential difference is established between the electrode members 34, 35 and the material 15. Accordingly, in any case, an electrostatic field or potential gradient is established having electrostatic lines of force extending between the electrodes and the respective surfaces of the substrate.

The reactive gas is then introduced through the hollow electrodes into the electrostatic field between the electrodes and the substrate. The introduction of the reactive gas is continued until sufficient gas pressure (or gas density) is established within the chamber 22 to cause a sustained glow discharge. The glow represents the initiation of ionization of the gas atoms by the electrostatic field established within the enclosure 22. The free electrons produced in the initial ionization process are also able to produce additional ions by collisions with neutral atoms of the reactive gas, each such collision producing an additional free electron and an additional ion, thereby resulting in a continuous production of ions. The glow generally is self-sustaining at an appropriate pressure, which in the illustrated embodiment is generally between 5 and 50 millitorrs.

The variables of pressure and voltage may be concurrently adjusted in order to obtain a self-sustaining glow resulting from the ionization of gas atoms by electrons moving in the electric field between the electrode members 34 and 35 and the substrate. It is advantageous to reach the point at which the glow is self-sustaining without going too far beyond this point. The determination of this point is relatively critical because arc discharge often begins to occur relatively close to the glow point, at which the glow becomes self-sustaining, and is generally an undesired effect for present purposes, since it may lead to additional contamination of the substrate being treated. Arcing often causes irretrievable contamination of the material being treated, rather than cleaning of it, in that holes may be gouged in the material by the arcing action. Preferably, the power supply 40 is of the conventional highly regulated variety to prevent voltage variations which might move the discharge into the arcing region after the glow region has been reached. The use of a constant-current variable-voltage power supply allows optimization of the cleaning process by setting the current at a given level and varying the voltage and/or the pressure higher and lower until the most effective cleaning is obtained.

When a self-sustaining glow-discharge is obtained and negative ions are produced, the ions tend to move from the electrode members 34 and 35 to the grounded material 15 in the situation where the material 15 is conductive. When the material 15 is nonconductive the negative ions similarly move from the electrode members 34 and 35 to the positively charged surfaces of the material 15. In both situations the ions pass from the electrode members 34 and 35 to the opposite surfaces of the material 15, thereby striking these surfaces. Not only does such bombardment tend to dislodge impurities present on the surfaces of the material 15 due to the physical impact of the ion and electron collisions, but the highly reactive negative ions impinging upon the surface tend to react chemically with the surface contaminants. Generally, gases are produced by these reactions, such as carbon monoxide, which do not readily adhere to the surfaces of the material, and may be readily removed. In certain instances nongaseous reaction products such as solid fluorocarbons or metal-organic compounds may be produced, and these are readily eliminated by merely permitting them to drop from the material due to gravity. Thus, the surface of the substrate being decontaminated or cleaned is treated both by the impact of charged particles on its surface and by the chemical combination of the reactive negative ions with the contaminants on its surface.

In a preferred embodiment of the present invention, which has been successfully employed, a strip of steel was introduced into an evacuated enclosure. A shielding structure approximately two sheet long and fabricated of aluminum was disposed about the strip of steel with a two inch space being provided between the longitudinal walls of the structure and the strip of steel, defining a chamber for constraining the glow to this particular region. A pair of electrode members were disposed in the chamber relatively close to the respective upper and lower walls of the chamber. The reactive gas trichloroethylene ($C_2HCl_3$) was introduced and an optimum glow-discharge occurred at a pressure of 50 millitorrs with 1500 volts at 5 amps being supplied to the electrode. Effective cleaning of the surface of the material was attained under these conditions by moving the steel strip through the enclosure at a velocity of ten feet per minute.

When a material which is in the shape of a strip, or a wire is to be processed, the enclosure 10 is readily adapted for processing the material, as previously mentioned. In addition, a suitable enclosing structure may be readily provided for other shapes of materials. For example, if a hemispherically-shaped material is being cleaned, an enclosure may be provided which permits the reactive gas to be supplied into the concave portion defined by the walls of the hemisphere. A suitable electrode may be disposed adjacent the opening of the material, and the opening may then be partially blocked from the remainder of the enclosure, such as by the provision of a simple cover which serves to constrain the glow to the interior of the hemisphere.

If desired, the cleaned material may be supplied directly from the enclosure 10 to the input of other apparatus when subsequent operations such as vapor plating, machining, etc., are to be carried out. Alternatively, additional processing of the cleaned material may be carried out within the evacuated enclosure 10.

Other metals than steel may of course be cleaned, such as copper, aluminum, etc., as well as non-metals such as glass and similar materials.

Thus, an improved method has been provided for removing impurities and contaminants from the surface of a material.

Various changes and modifications other than those mentioned may be made in the above-described method without deviating from the spirit or scope of the present invention, and will be apparent to those skilled in the art based on the teachings hereof. Accordingly, the scope of the invention should be defined only by the scope of the appended claims, and equivalents thereof.

Various features of the invention are set forth in the following claims.

What is claimed is:

1. A cleaning method for removing oxide and gaseous contaminants from the surface of a substrate which may be subsequently coated by vacuum evaporative techniques, said cleaning method comprising the steps of introducing into a vacuum enclosure a reactive gas which is a reducing agent and capable of yielding negative ions which are chemically combinable with the oxide contaminants; generating an electric field in said vacuum enclosure having a potential gradient between the location of said surface to be cleaned and a location spaced from said surface; polarizing said potential gradient so that said location of the surface is positive relative to said spaced location; providing a magnitude of the potential gradient and a reduced pressure of said reactive gas at respective values causing ionization of the reactive gas and the formation of said negative ions in a sustained glow discharge, bombarding the surface to be cleaned with electrons from said discharge which are accelerated toward said surface by said potential gradient, and causing the negative ions to be accelerated toward said surface by said potential gradient with sufficient energy to dislodge the contaminants therefrom and to chemically react with the oxide contaminants to produce reaction products which do not readily adhere to the surface to be cleaned.

2. The cleaning method of claim 1 wherein said location spaced from the surface to be cleaned is the general location within said vacuum enclosure at which the reactive gas is introduced.

3. The cleaning method of claim 1 including the step of confining the glow-discharge to a limited region within said vacuum enclosure and about said substrate.

4. The cleaning method of claim 1 wherein said reactive gas includes an organic halide.

5. The cleaning method of claim 1 wherein said reactive gas is selected from the group consisting of methane, ethane, trichloroethylene, hydrogen chloride, and gaseous fluorinated hydrocarbons.

6. The cleaning method of claim 1 further comprising the step of passing the surface to be cleaned through the path of the negative ions accelerated by the potential gradient.

References Cited

UNITED STATES PATENTS

| | | | |
|---|---|---|---|
| 2,750,544 | 6/1956 | Pfann | 204—164 |
| 2,841,477 | 7/1958 | Hall | 156—17 |
| 3,057,792 | 10/1962 | Frohlich | 204—165 |
| 3,342,715 | 9/1967 | Brissot et al. | 204—164 |
| 3,386,909 | 6/1968 | Hough | 204—312 |
| 3,394,066 | 7/1968 | Miles | 204—164 |

OTHER REFERENCES

L. Holland: Vacuum Deposition of Thin Films, pp. 75, 76, pub. by Chapman & Hall Ltd., 1963.

FREDRICK E. EDMUNDSON, Primary Examiner

U.S. Cl. X.R.

204—312, 325